No. 673,643. Patented May 7, 1901.
H. A. KNOX.
POWER TRANSMISSION DEVICE.
(Application filed Oct. 5, 1900.)
(No Model.) 2 Sheets—Sheet I.
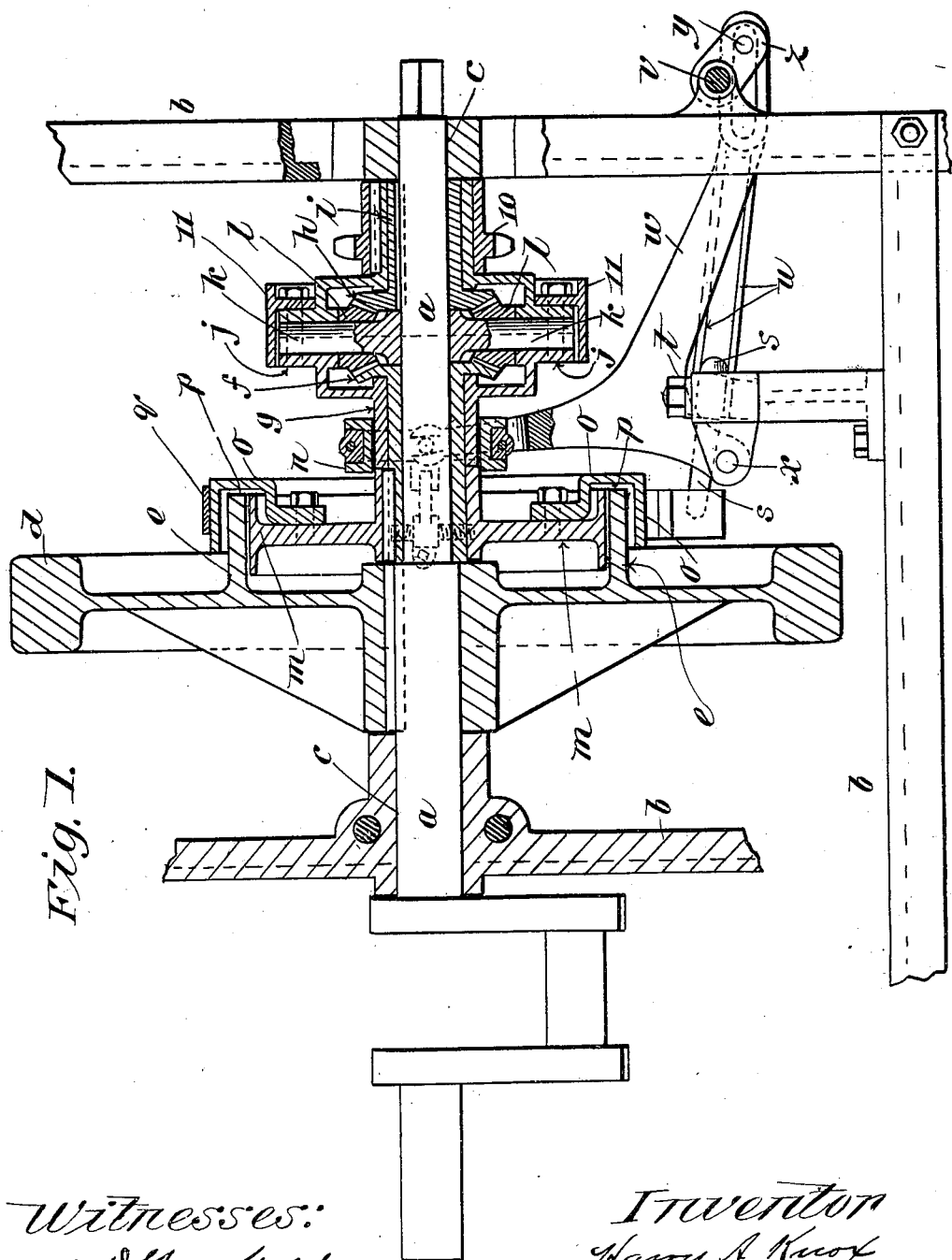
Fig. I.
Witnesses:
J. W. Garfield
K. D. Clemons
Inventor
Harry A. Knox
by Chapin & Co
Attorneys.

No. 673,643. Patented May 7, 1901.
H. A. KNOX.
POWER TRANSMISSION DEVICE.
(Application filed Oct. 5, 1900.)
(No Model.) 2 Sheets—Sheet 2.
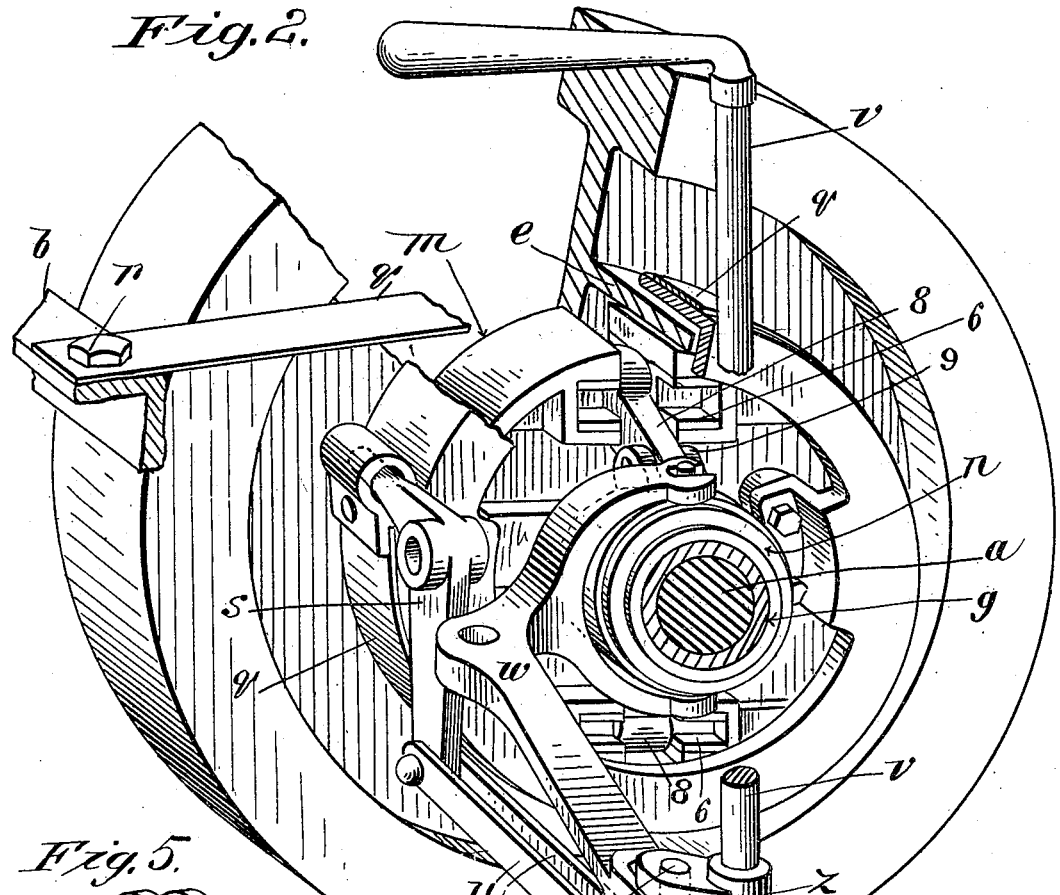
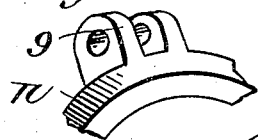
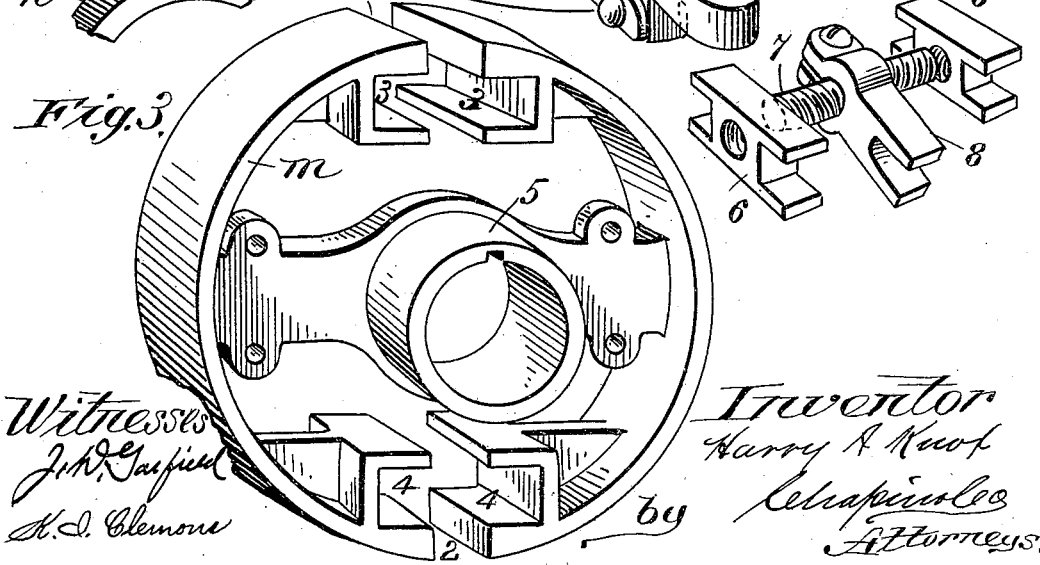

UNITED STATES PATENT OFFICE.

HARRY A. KNOX, OF SPRINGFIELD, MASSACHUSETTS.

POWER-TRANSMISSION DEVICE.

SPECIFICATION forming part of Letters Patent No. 673,643, dated May 7, 1901.

Application filed October 5, 1900. Serial No. 32,165. (No model.)

*To all whom it may concern:*

Be it known that I, HARRY A. KNOX, a citizen of the United States of America, residing at Springfield, in the county of Hampden and State of Massachusetts, have invented new and useful Improvements in Power-Transmission Devices, of which the following is a specification.

This invention relates to clutch mechanisms between a motor and a driving-shaft whereby different speeds may be imparted to the latter, or, if desired, the driving-shaft may be disconnected entirely from the motor.

The object of the invention is to provide a clutch or transmission mechanism of the above-described class which will be under the control of one operating-lever and of compact and simple construction and easily adjustable to take up wear, &c., all as fully set forth in the following specification and pointed out in the claims.

In the drawings forming part of this specification, Figure 1 is a horizontal sectional view taken on the axis of the crank-shaft of a motor of a clutch or power-transmitting device embodying this invention. Fig. 2 is a perspective view, somewhat enlarged, of a part of said mechanism, partly broken away. Fig. 3 is a perspective view of the expansible member of the clutch proper. Fig. 4 is a perspective view of the clutch-expanding devices. Fig. 5 is a perspective view of a part of the sliding collar whereby the clutch-expanding devices are operated.

Referring to the drawings, $a$ indicates the crank-shaft of a motor of any suitable type, and $b$ portions of the frame thereof, in which said shaft is supported in suitable bearings, two of which are shown, (indicated by $c$.) On the crank-shaft is secured by a key the balance-wheel $d$, provided with an annular flange $e$, projecting therefrom in line with the axis of the crank-shaft and concentric therewith. It is not essential that said flange $e$ be made integral with said balance-wheel, as shown, but it may be provided with a hub and keyed onto the shaft close to the balance-wheel $d$; but the preferred method, for obvious reasons, is to make the flange on the wheel $d$, as shown. Between the balance-wheel $d$ and the outer end of the crank-shaft $a$ is mounted on the latter a differential gearing comprising a bevel-gear $f$, rotatable on the shaft and having the long hub extending back to the hub of said balance-wheel. Opposite to this bevel-gear $f$ is another bevel-gear $h$, having the same number of teeth as $f$ and facing the latter. This gear $h$ has a hub $i$ extending toward the outer end of the shaft. These bevel-gears $f$ and $h$ are inclosed by a casing $j$, which has a bearing on both of said hubs, and in which casing are the oppositely-located pins $k$, on which are supported the bevel-gears $l$, turning freely thereon and in mesh with both of the bevel-gears $f$ and $h$.

The expansible clutch member $m$ (shown in Fig. 3) is keyed onto the hub of the gear $f$ close up against the hub of the balance-wheel $d$ and within the annular flange $e$, the outer edges of the clutch member and said flange being in substantially the same plane. The hub of said clutch member $m$ and that portion $g$ of the casing $j$ which fits over the hub of the gear $f$ are of the same diameter, and a collar $n$ has a free sliding movement thereon.

The outside diameter of the expansible clutch member $m$ is somewhat smaller than that of the inside diameter of the annular flange $e$, to the end that when the clutch member is in its contracted position it may be rotated freely within said flange in close proximity to the inner surface thereof. The rim of said clutch member is divided transversely to permit of its being expanded, as below described.

A flange $o$, having an annular groove $p$ therein, is bolted to the web of the clutch member $m$, as shown in Figs. 1 and 2, the contiguous edges of the clutch member $m$ and the flange $e$ and the flange $o$ extending over but out of contact with the said flange $e$. A strap $q$ passes around this flange $o$ (see Fig. 2) and has one of its ends attached to the frame at $r$ and its other end connected with one arm of an elbow-lever $s$, pivotally supported on the frame $b$ at $t$, Fig. 1. To the other arm of this elbow-lever $s$ the strap connection $u$ is attached, and from thence it extends to an operating-shaft $v$, supported in proximity to the motor. Connected pivotally with the collar $n$ is the forked angular lever $w$, pivoted on the frame at $x$, Fig. 1, and whose free end is substantially parallel with and just above the free end of the strap connection $u$. This free end of the lever $w$ is slotted, and a stud $y$, secured in the crank $z$ on the lower end of the operating-shaft $v$, passes down through said slotted end of the lever $w$ and has attached to its lower end the free end of the strap connection $u$. Thus the oscillation of the shaft $v$ and its crank $z$ will when swung toward the position shown in Fig. 2 of the drawings effect the tightening of the strap $q$ around the flange $o$, and by its said movement the lever $w$ effects the unclutching of the expansible member $m$ from the flange $e$. The swinging of the shaft and its crank in the opposite direction will reverse these movements by means fully described farther on.

The clutch member $m$ and its hub are of cast-iron and made in one piece, the rim being divided, as above stated, and each half of the rim supported by arms cast onto said hub. These arms are connected with the two semicircular portions of the rim at about the center of the latter. When the rim is expanded, the portions thereof which come in contact with the flange $e$ are those which lie contiguous to the extremities of the two halves of the rim.

When the collar $n$ is moved toward the clutch member by the actuation of the forked lever $w$, with which it is connected, as described, the clutch member $m$ is expanded against the inner surface of the flange $e$, as follows: By referring to Fig. 3 it will be seen that the said clutch member resembles a pulley whose rim is divided at two opposite points 1 and 2, and at these points under the rim are provided two rectangular grooves 3 3 and 4 4, running parallel with the axis of the hub 5 of the clutch member $m$, adapted to receive the loose rectangular nuts 6. These are threaded with a right and left hand screw-thread, respectively, and a similarly-threaded screw 7 enters said nuts. On said screw 7, about midway between its ends, is secured a lever 8, whose free end is forked and straddles a pin supported between two lugs 9 on the collar $n$. (See Figs. 2 and 5.) By reason of the difference in the diameters of the collar $n$ and the point on the clutch member $m$ at which the screw 7 is located the said lever 8 hangs down at an angle to the axis of the clutch member. Hence upon the movement of the collar $n$ toward and from the clutch member said lever will be caused to swing, and thus rotate the screw 7, which will cause the nuts 6 either to be drawn toward each other or separated. The end of the lever 8 through which the end of the screw 7 passes is split, and a screw passing through said split ends serves to clamp said lever on the screw. This construction is for the purpose of adjustment. If the clutch member or the flange $e$ wears, for instance, so that it requires a longer throw of the lever 8 to separate the contacting portions of the clutch member than the throw of the collar $n$ is capable of effecting, then the lever 8 may be loosened from the screw and swung upward a short distance and again tightened on the screw and then brought down again into engagement with the collar. This will increase slightly the normal separation between the ends of the rim where it is divided, and thus when the collar $n$ is moved up the degree to which the screw 7 will have to be turned to effect the contact of the clutch with the flange $e$ will be well within the range of action of said collar. When the collar $n$ moves toward said clutch member, the nuts 6 are separated, thus forcing the two parts of the rim of said member lying each side of the cuts 3 and 4 in the rim thereof against the inner surface of the flange $e$, and thus locking together the said member and said flange, and the clutch member being keyed to the hub of the gear $f$ and the clutch being keyed to the crank-shaft $a$ it follows that the gear $f$ and the shaft will rotate as one, and the sprocket-wheel 10, which is keyed on the hub-like portion of the casing $j$, (which incloses the long hub $i$ of the gear $h$,) will thus be rotated at the normal speed of the motor, for when the gear $f$ is held against rotation (the gear $h$ being keyed on the crank-shaft) it is obvious that the casing $j$ must rotate as one with the crank-shaft. This is the rotation of the parts when the clutch member $m$ is locked to the flange $e$. To effect this locking of the clutch and flange, the operating-shaft $v$ is swung to the right from the position shown in Fig. 1. To reduce the speed of rotation of the sprocket 10, the operating-shaft is swung to the left to the position shown in Fig. 2. This will oscillate the elbow-lever $s$ through the strap connection $u$ between the depending arm of said lever $s$ and the stud $y$ in the crank $z$, whereby the other arm of the lever $s$, connected with the strap $q$, will be swung upward, causing said strap to grip the flange $o$ and hold the clutch member against rotation. It will be seen that this same movement of the operating-shaft will unclutch the member $m$ from the flange $e$. The transmission of movement under these conditions will be as follows: The crank-shaft $a$ will rotate the gear $h$, which will rotate the pinions $l$ around the face of the now stationary gear $f$, and thus impart to the casing $j$ a reduced speed of rotation, according to the well-known action of these planetary or differential gears constituting a part of the transmission devices. To permit the crank-shaft to rotate without imparting any movement whatever to the sprocket 10, the operating-shaft may be swung to the position shown in Fig. 1, in which position the clutch member $m$ will be out of contact with the flange $e$ and the strap $q$ will be loose on the flange $o$.

From the above description it is seen that by the manipulation of the operating-shaft the motor may be connected directly to the driven member, or it may be connected therewith through the differential gearing, whereby the speed transmitted may be reduced, or it may be disconnected from the driven member entirely. Furthermore, the type of the clutch mechanism is such that a slipping connection may be had with the flange e, and thus as much or as little movement be transmitted as desired. This is also true of the low speed attained by unclutching the member m and tightening the strap q, and if the latter be allowed to slip on the flange o the speed of rotation of the sprocket-wheel will be still further reduced. The flange 11, bolted on the casing j, is annular in shape and adapted to receive a brake-strap, if desired.

In lieu of the sprocket 10 a pulley may be mounted on the hub of the casing or secured on said casing in any manner whereby it may rotate concentrically with the crankshaft, if desired.

Obviously the casing j, considered as a boxing for the gears and a support for the driven member 10, is not an essential element of the invention in the precise form shown and described herein. If desired, the driven member 10 and the pins k, which support the intermediate bevel-gears l, may comprise one construction and the casing be done away with without changing the method of operation of the device; but the construction shown in the drawings is the preferred one.

A further advantage in the construction shown and described herein of the means for operating the band-brake q and the clutch member lies in the capability of using said devices as a brake, and it may be done as follows: Referring to Fig. 1, when the crank z of the operating-lever lies in the position shown in this figure it is self-evident that if it is swung to the left it will tighten the strap q without materially moving the collar n, and if said crank be swung to the right the stud y in the crank will strike the end of the slot in the lever w and, swinging said lever on its pivot x, will slide the collar n toward the clutch and cause the latter to engage the flange e. This movement swings the arm w under the shaft v and somewhat beyond it. Now if the movement of the crank-arm z be continued the stud y can be moved along the slot in the arm w without releasing the clutch, and this movement will cause the strap q to be tightened up in the same manner as it would if the stud be swung to the left from the position in which it is shown in Fig. 1. When the above movement is given to the crank z and the clutch and the strap q are brought into operation together, the entire mechanism is locked, and the effect is the same as applying a brake to any rotating part of the mechanism.

Having thus described my invention, what I claim, and desire to secure by Letters Patent of the United States, is—

1. The combination with the crank-shaft of a motor, of a differential gearing mounted thereon comprising a bevel-gear keyed to said shaft, and a second bevel-gear loose on said shaft; two oppositely-located bevel-gears intermediate of said first-named gears and in mesh therewith, a casing in which said intermediate gears are mounted, which casing rotates concentrically with said crank-shaft; a driven member, as a sprocket-wheel, mounted on said casing concentrically with the crank-shaft, a balance-wheel on the latter having a concentric flange projecting from one side thereof, a clutch member secured to the bevel-gear loose on the crank-shaft, and whose periphery is in close proximity to said flange, and means for expanding said clutch member to effect a rotative engagement with said flange, whereby the normal speed of the motor may be transmitted to the said driven member, substantially as described.

2. In a transmission device of the class described, a shaft which constitutes the driving member, a differential gearing mounted thereon comprising two bevel-gears face to face on said shaft, one tight and one loose thereon, intermediate gears in mesh with said tight and loose bevel-gears; a support for the latter adapted to rotate around said shaft, and a driven member, as a pulley or sprocket-wheel, secured to said support; a clutch member secured to and rotatable with the bevel-gear loose on the shaft, a flange secured to and rotatable with the shaft, and a strap encircling said clutch member; a clutch-operating member having also a connection with said strap, and means for operating said last-named member, whereby when the clutch member is in engagement with said flange, said strap will loosely encircle said member, and when the clutch is free from said flange the strap may tightly encircle the clutch and hold it against rotation, substantially as described.

3. The combination with the crank-shaft of a motor, of a differential gearing mounted thereon comprising a bevel-gear keyed to said shaft, and a second bevel-gear loose on said shaft; two oppositely-located bevel-gears intermediate of said first-named gears and in mesh therewith, a casing in which said intermediate gears are mounted, which casing rotates concentrically with said crank-shaft; a driven member, as a sprocket-wheel, mounted on said casing concentrically with the crank-shaft, a clutch member mounted on the bevel-gear loose on said shaft, and adapted to rotatively engage said shaft, a strap normally loosely encircling said member, a lever for operating said clutch, and a connection between said strap and said operating-lever consisting of an elbow-lever and a rigid connection therefrom to said operating-lever, whereby when the clutch is moved out of engagement with said shaft, said strap will be tightened around said clutch to prevent its rotation, and vice versa, substantially as described.

4. In a transmission device of the class described, a driving-shaft, a differential gearing on said shaft comprising two gears, one fixed and one loose thereon, a member fixed on said shaft having a flange projecting from the side thereof; an expansible clutch member secured on said loose gear consisting of a ring having a suitable hub, the periphery of which ring is divided transversely at one or more points; means interposed between the divided ends of said ring whereby they may be sprung apart, a member having a connection with said ring-separating means, and a lever for moving said member, combined with means operated by said lever for holding the clutch member against rotation, when said expansible clutch is contracted, substantially as described.

5. In combination with a transmission device of the class described, comprising differential gearing mounted on a driving-shaft for the purpose described, an operating-shaft, a braking mechanism and means to effect the rotation of the driving member of said transmission device at one rate of speed by partial rotation of the shaft in one direction, and by its partial rotation in an opposite direction to effect the rotation of said driven member at a different rate of speed, and by the continued rotary movement of said operating-shaft in one direction to operate said braking mechanism, substantially as described.

6. In a transmission device of that class comprising differential gearing, and means for clutching one of two members of said gearing and holding it against rotation to effect the variable rotation of the driven member of the gearing, the combination with an operating member, a clutch mechanism forming part of the differential gearing, and means of connection between said operating member and said clutch mechanism whereby the partial rotation in opposite directions of the operating member will effect the clutching and unclutching of one of said members of the differential gearing, and the continued rotatory movement of said operating member in one direction will effect the clutching of both of said members and lock said transmission device against rotation, substantially as described.

7. In combination, a propelling mechanism, a braking device, a controlling-lever and connections to effect the operation of the driven shaft at one rate of speed by movement of said lever in one direction, and by continued movement in the same direction retard the mechanism, and by movement of the lever in the opposite direction effect the operation of the driven shaft at a different rate of speed, and by continued movement in the latter direction to also retard the mechanism, substantially as described.

8. A driving mechanism, comprising differential gearing, means to retard one member of the gearing, means to lock two members of the gearing to each other, an operating-lever and connections whereby movement of the operating-lever in one direction applies the retarding means, and movement in the opposite direction applies the locking means, and by continued movement in the latter direction also applies the retarding means, substantially as described.

9. A driving mechanism, comprising differential gearing, means to retard one member of the gearing, means to lock two members of the gearing to each other, an operating-lever and connections whereby movement of the operating-lever in one direction applies the locking means, and movement in the opposite direction applies the retarding means, and by continued movement in the latter direction also applies the locking means, substantially as described.

HARRY A. KNOX.

Witnesses:
WM. H. CHAPIN,
K. I. CLEMONS.